United States Patent
Tschirschke

(10) Patent No.: US 10,119,549 B2
(45) Date of Patent: Nov. 6, 2018

(54) EXHAUST-GAS TURBOCHARGER

(71) Applicant: BorgWarner Inc., Auburn Hills, MI (US)

(72) Inventor: Juergen Tschirschke, Hettenleidelheim (DE)

(73) Assignee: BorgWarner Inc., Auburn Hills, MI (US)

( * ) Notice: Subject to any disclaimer, the term of this patent is extended or adjusted under 35 U.S.C. 154(b) by 591 days.

(21) Appl. No.: 14/406,324

(22) PCT Filed: Jun. 14, 2013

(86) PCT No.: PCT/US2013/045784
§ 371 (c)(1),
(2) Date: Dec. 8, 2014

(87) PCT Pub. No.: WO2013/192029
PCT Pub. Date: Dec. 27, 2013

(65) Prior Publication Data
US 2015/0125273 A1    May 7, 2015

(30) Foreign Application Priority Data

Jun. 21, 2012  (DE) ................ 10 2012 012 496

(51) Int. Cl.
*F04D 27/00*    (2006.01)
*F01D 17/10*    (2006.01)
(Continued)

(52) U.S. Cl.
CPC ......... *F04D 27/009* (2013.01); *F01D 17/105* (2013.01); *F01D 17/20* (2013.01);
(Continued)

(58) Field of Classification Search
CPC ........ F01D 17/105; F01D 17/20; F01D 25/24; F02B 37/183; F02B 37/186; F04D 17/10;
(Continued)

(56) References Cited

U.S. PATENT DOCUMENTS 4,730,456 A * 3/1988 Tadokoro ................ F01D 17/18
251/298
2002/0078934 A1* 6/2002 Hohkita ................ F01N 3/2006
123/564
(Continued)

FOREIGN PATENT DOCUMENTS

EP    2444626 A1    4/2012
JP    2003172211 A *  6/2003
(Continued)

OTHER PUBLICATIONS

International Search Report and Written Opinion in International Application No. PCT/US2013/045784 dated Aug. 23, 2013.

*Primary Examiner* — Phutthiwat Wongwian
*Assistant Examiner* — Matthew T Largi
(74) *Attorney, Agent, or Firm* — Eric L. Doyle; Stephan A. Pendorf; Patent Central LLC

(57) ABSTRACT

An exhaust-gas turbocharger (1) with a turbine housing (2) which has a turbine housing inlet (8) and a turbine housing outlet (9) for exhaust gas, and which has a wastegate duct (19) between the turbine housing inlet (8) and the turbine housing outlet (9), and a flap arrangement (10) having a pivotable flap plate for opening and closing the wastegate duct (19), wherein the flap plate is in the form of an elastic spring disk (11).

8 Claims, 4 Drawing Sheets

Figure 1:
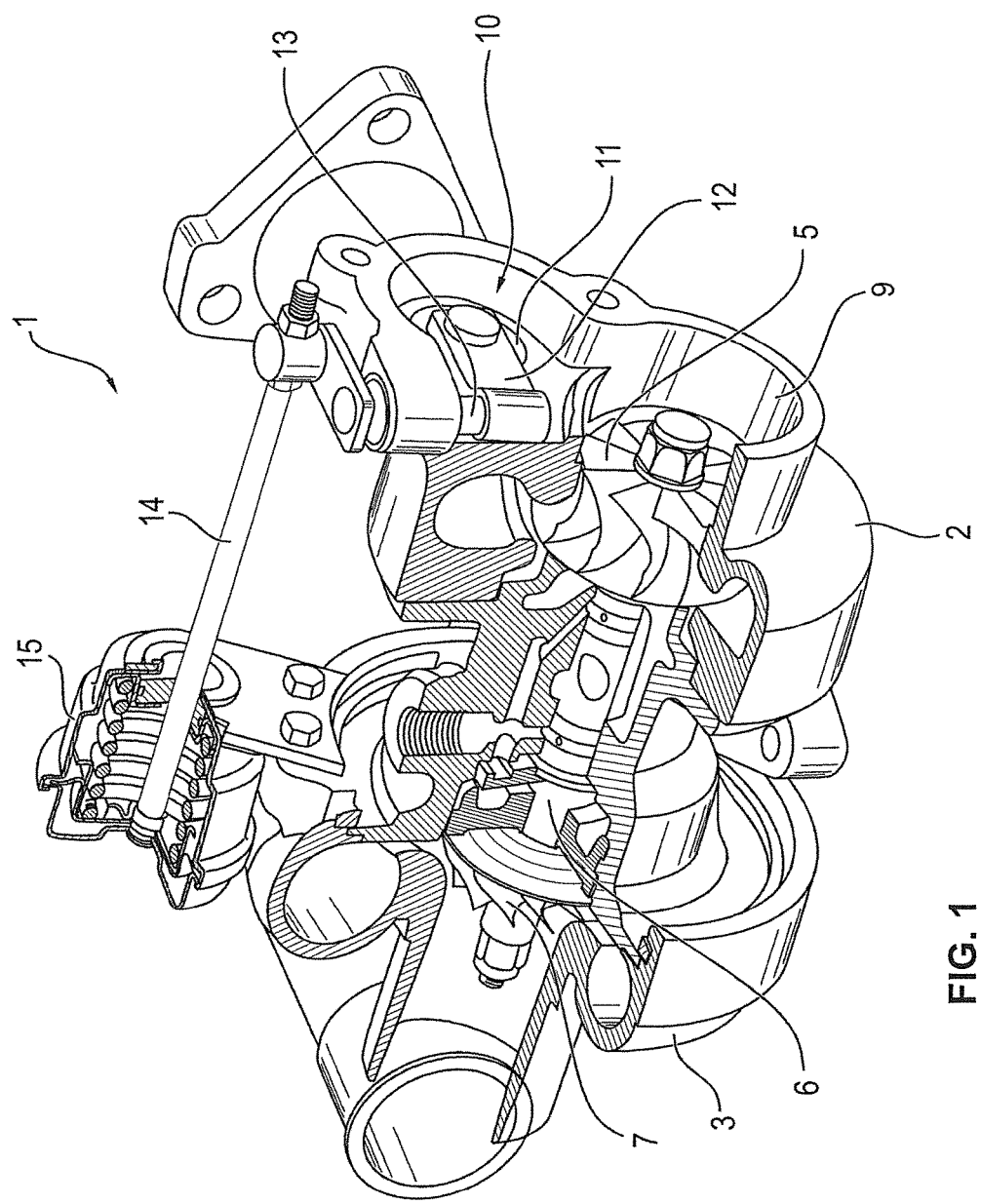

(51) Int. Cl.
   *F01D 17/20* (2006.01)
   *F01D 25/24* (2006.01)
   *F02B 37/18* (2006.01)
   *F04D 17/10* (2006.01)
   *F04D 29/40* (2006.01)

(52) U.S. Cl.
   CPC ............ *F01D 25/24* (2013.01); *F02B 37/183* (2013.01); *F02B 37/186* (2013.01); *F04D 17/10* (2013.01); *F04D 29/403* (2013.01); *F05D 2220/40* (2013.01); *Y02T 10/144* (2013.01)

(58) Field of Classification Search
   CPC ... F04D 27/009; F04D 29/403; F05D 2220/40
   See application file for complete search history.

(56) References Cited

U.S. PATENT DOCUMENTS

2011/0000209 A1* 1/2011 Boening ................. F01D 17/20
                                                                 60/602
2012/0055154 A1* 3/2012 Ebert .................... F01D 17/105
                                                                 60/602

FOREIGN PATENT DOCUMENTS

| WO | 2006046810 A1 | 5/2006 | |
| WO | WO 2006046810 A1 * | 5/2006 | ............ F02B 37/025 |

* cited by examiner

EXHAUST-GAS TURBOCHARGER

The invention relates to an exhaust-gas turbocharger according to the preamble of claim 1.

For charge pressure regulation, the generic exhaust-gas turbocharger is provided with a wastegate duct which connects the turbine inlet to the turbine outlet while bypassing the turbine wheel. When the required charge pressure is attained, at least a part of the exhaust-gas flow can be conducted past the turbine or past the turbine wheel through said wastegate or bypass duct. To open and close said wastegate duct, there is provided a wastegate flap which is also referred to as a charge pressure regulating flap. Said charge pressure regulating flap is connected via a linkage to an actuator which may for example be in the form of a pneumatic or electric control capsule.

It is an object of the present invention to provide an exhaust-gas turbocharger of the type specified in the preamble of claim 1 which, while being inexpensive to produce and assemble, can be operated with low maintenance and in an efficient manner. In particular, it is an object of the present invention to design the flap arrangement for the wastegate duct to be as simple and low-maintenance as possible.

This object is achieved by the features of claim 1. The dependent claims present preferred refinements of the invention.

According to the invention, the flap plate of the flap arrangement is in the form of an elastic spring disk. Here, the spring disk is not a further component within the flap arrangement but rather the entire flap plate is in the form of an elastic spring disk. In the closed state of the flap arrangement, therefore, the spring disk bears directly against the turbine housing and thus directly seals off the wastegate duct (also: bypass).

The elastically deformable spring disk seals off the wastegate duct as a result of the flexibility of said spring disk. Here, the spring disk compensates the distortion and the effects, for example an oblique position, owing to component tolerances.

For the adjustment of the spring disk, a flap shaft is rotatably mounted in the turbine housing. A regulating rod acts on one end of the flap shaft. The regulating rod is moved for example by means of an actuator. The spring disk is connected via a lever to the other, inner end of the flap shaft. By rotation of the flap shaft, the spring disk pivots, and the wastegate duct is thus opened and closed. It is particularly preferable for a direct and rigid connection of the spring disk, formed as a flap plate, to the flap shaft to be provided. This requires a direct connection, which is as free from play as possible, between the lever and the flap shaft, and a direct connection, which is as free from play as possible, between the lever and the spring disk. It is thus particularly preferably provided that the lever is manufactured in one piece with the flap shaft, or that a cohesive connection, for example a welded connection, is formed between the flap shaft and lever. For the connection, which is as direct and free from play as possible, between the lever and spring disk, the spring disk bears in particular directly against the lever.

It is particularly preferable for a recess to be provided in the spring disk. A pin projects through said recess. The pin is either connected to the lever or is an integral constituent part of the lever. The spring disk is thus clamped between a head of the pin and the lever or between the lever and a counterpart which is mounted on the pin. The counterpart is either screwed or welded to the pin.

As a result of the direct and rigid connection of the spring disk to the flap shaft, vibrations between said components are substantially prevented, such that neither acoustic problems nor significant vibration-induced frictional wear are generated.

Figure 2:
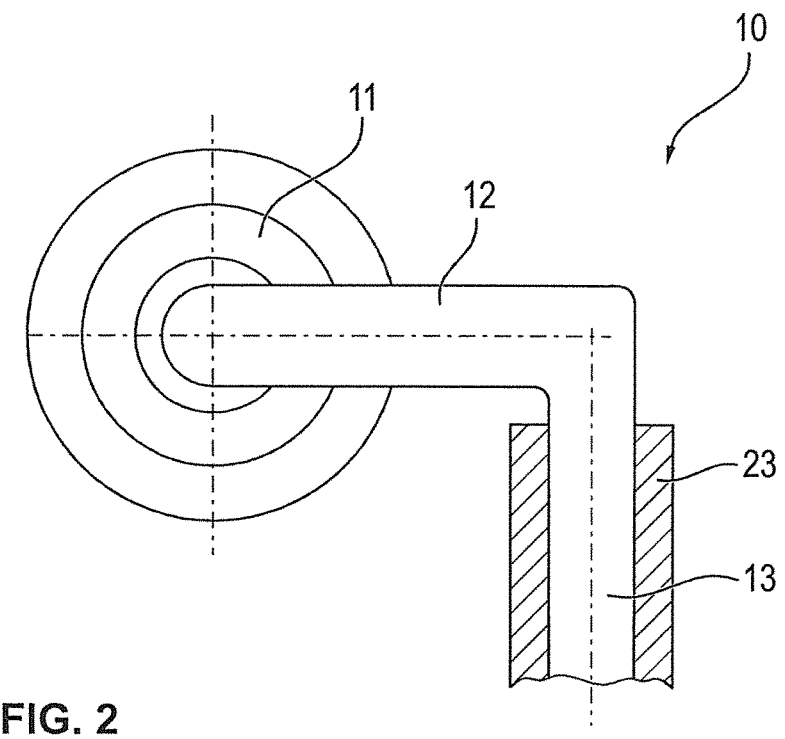
Figure 3:
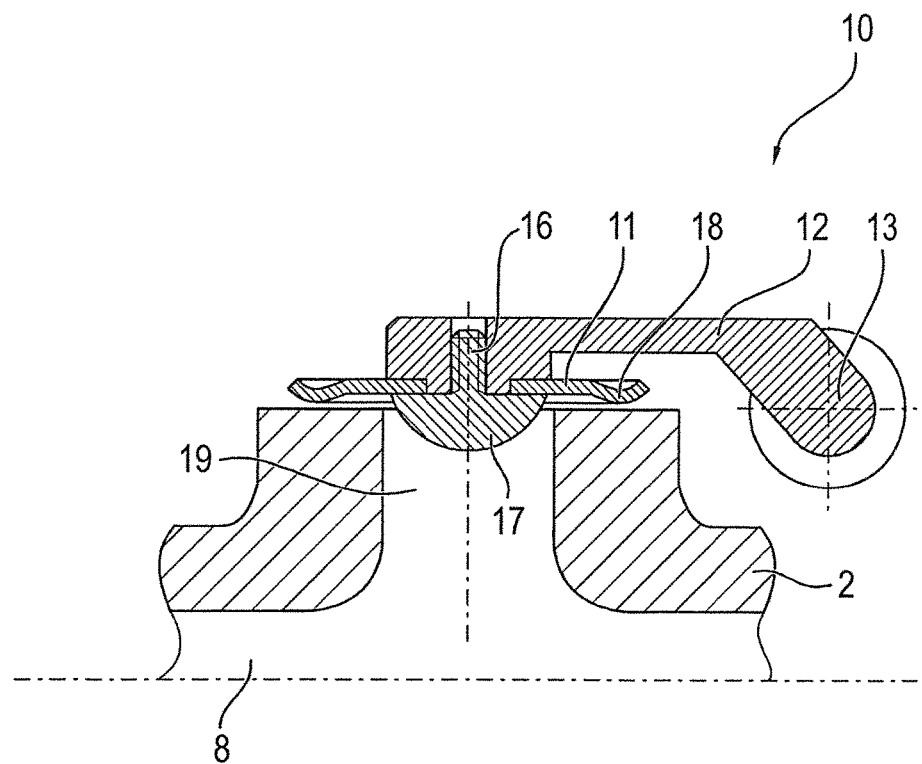
Figure 4:
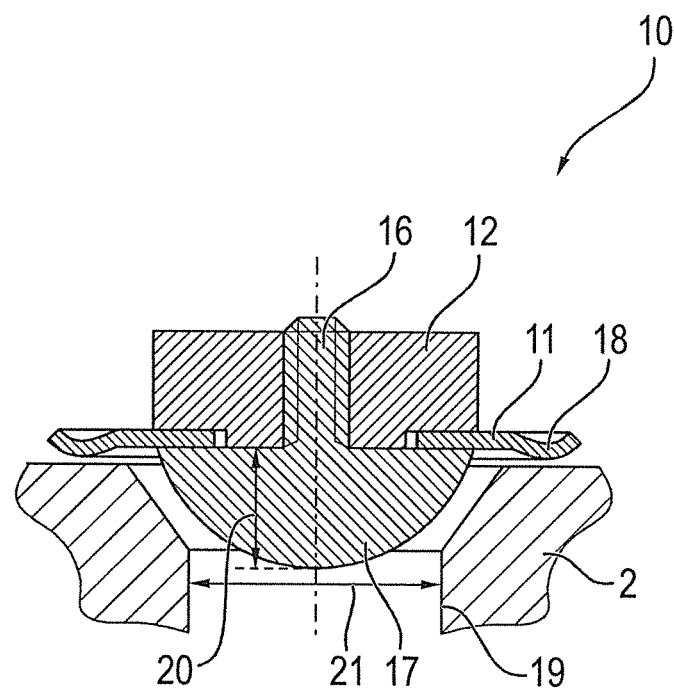
Figure 5:
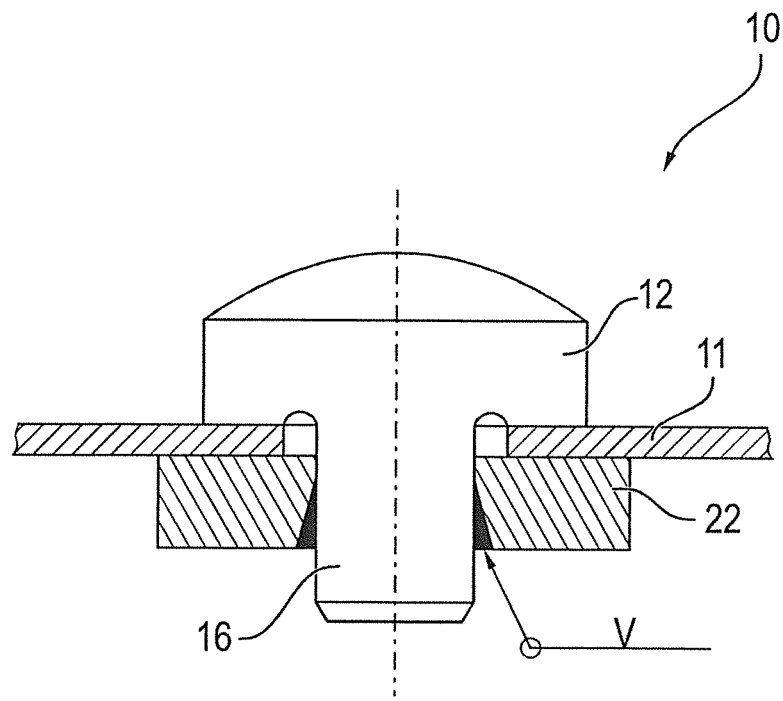
Figure 6:
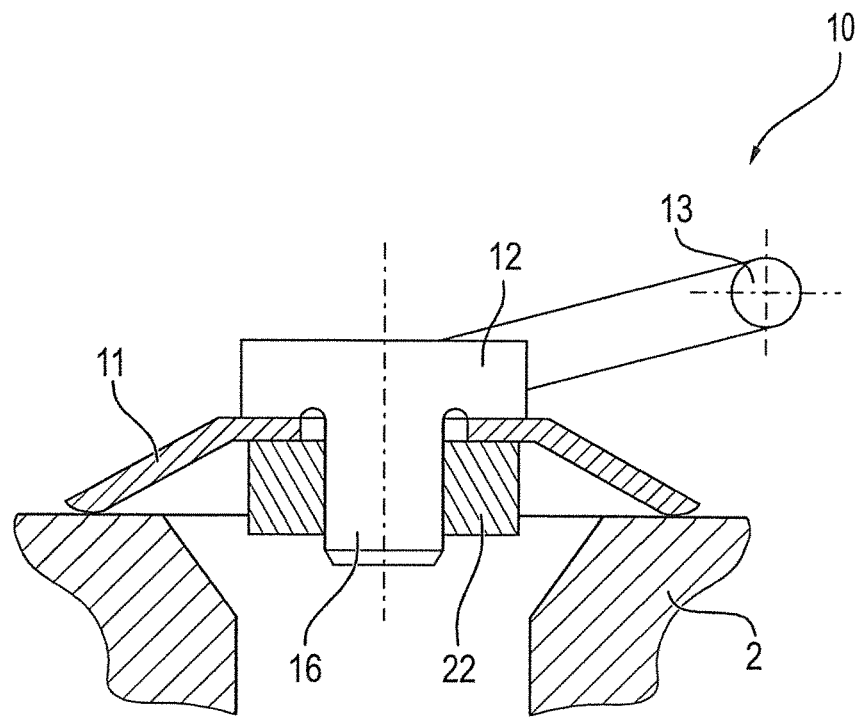
Figure 7:
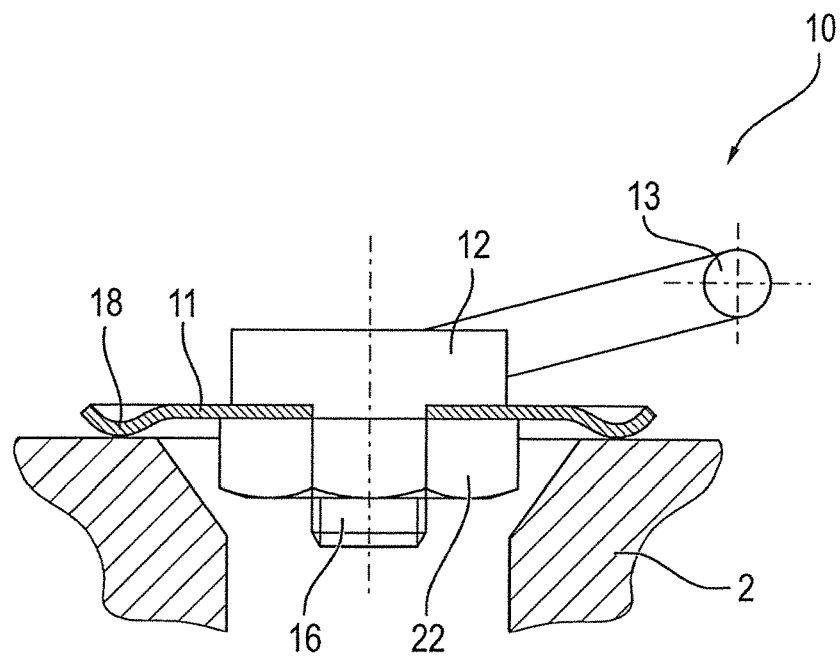

Further details, advantages and features of the present invention become apparent from the following description of exemplary embodiments with reference to the drawing, in which:

FIG. 1 shows an exhaust-gas turbocharger according to the invention as per a first exemplary embodiment, FIGS. 2 and 3 show a flap arrangement of the exhaust-gas turbocharger according to the invention as per the first exemplary embodiment, FIG. 4 shows a flap arrangement of the exhaust-gas turbocharger according to the invention as per a second exemplary embodiment, FIG. 5 shows a flap arrangement of the exhaust-gas turbocharger according to the invention as per a third exemplary embodiment, FIG. 6 shows a flap arrangement of the exhaust-gas turbocharger according to the invention as per a fourth exemplary embodiment, and FIG. 7 shows a flap arrangement of the exhaust-gas turbocharger according to the invention as per a fifth exemplary embodiment.

FIG. 1 shows an exhaust-gas turbocharger 1 in a partially cut-away illustration. The construction of the exhaust-gas turbocharger shown generally in FIG. 1 applies to all exemplary embodiments. As per FIG. 1, the exhaust-gas turbocharger 1 comprises a turbine housing 2, a compressor housing 3 and a bearing housing 4 arranged between the turbine housing 2 and the compressor housing 3. A turbine wheel 5 is arranged in the turbine housing 2. A shaft 6 is rotatably mounted in the bearing housing 4. A compressor wheel 7 is situated in the compressor housing 3. The turbine wheel 5 and the compressor wheel 7 are rotationally conjointly mounted on the shaft 6. Exhaust gas is introduced via a turbine housing inlet 8. Said exhaust gas flows to the turbine wheel 5 and exits the arrangement via a turbine housing outlet 9. The turbine wheel 5 is set in rotation by the exhaust gas. The compressor wheel 7 is thus also set in rotation via the shaft 6. Charge air for an internal combustion engine is compressed by means of the compressor wheel 7.

A wastegate duct 19 (see FIG. 3) is formed in the turbine housing 2. Via said wastegate duct 19, the exhaust gas can be conducted directly from the turbine housing inlet 8 to the turbine housing outlet 9, bypassing the turbine wheel 5. The wastegate duct 19 can be closed off by means of a flap arrangement 10.

The flap arrangement 10 comprises a flap plate which, according to the invention, is in the form of a spring disk 11. Said spring disk 11 bears sealingly against the turbine housing 2, and thus closes off the wastegate duct 19, when the flap arrangement 10 is in the closed state.

The spring disk 11 is connected to a flap shaft 13 via a lever 12. The flap shaft 13 is arranged rotatably in the turbine housing 2. A regulating rod 14 acts on the outer end of the flap shaft 13. The regulating rod 14 is moved by means of an actuator 15, for example a pneumatic control capsule.

Identical or functionally identical components are denoted by the same reference numerals in the exemplary embodiments shown here. FIGS. 2 to 7 are schematic, simplified illustrations of the flap arrangement 10.

FIGS. 2 and 3 show the detailed design of the flap arrangement 10 according to the first exemplary embodiment. As can be seen in FIG. 2, the flap shaft 13 is held rotatably in the turbine housing 2 by means of a plain bearing 23. The flap shaft 13 is preferably manufactured in one piece together with the lever 12. Alternatively, a highly rigid screw connection or a welded connection between the flap shaft 13 and lever 12 is also possible.

FIG. 3 shows, in detail, the connection between the lever 12 and the spring disk 11. A central recess is provided in the spring disk 11. The spring disk 11 bears directly against the lever 12. A pin 16 with a pin head 17 is inserted through the recess in the spring disk and is screwed to the lever 12. The spring disk 11 is therefore clamped between the pin head 17 and the lever 12. In the example shown, the pin head 17 faces toward the wastegate duct 19.

The annular, fully encircling sealing surface on the spring disk 11 is designed as a fully encircling bead 18.

FIG. 4 shows a second exemplary embodiment. Here, the pin head 17 is formed so as to be very much larger than in the first exemplary embodiment. The pin head 17 has a head height 20. A diameter 21 of the wastegate duct 19 is measured perpendicular to the head height 20. The head height 20 amounts to at least 30% of the diameter 21. In order that there is space for the entire pin head 17 in the wastegate duct 19, the wastegate duct 19 is flared toward the turbine housing outlet 9.

FIG. 5 shows a third exemplary embodiment. In the third exemplary embodiment, the pin 16 is manufactured in one piece with the lever 12. A counterpart 22 is mounted onto the pin 16 on the side facing toward the wastegate duct 19. The spring disk 11 is therefore clamped between the lever 12 and the counterpart 22. The counterpart 22 is welded to the pin 16.

FIG. 6 shows a fourth exemplary embodiment. In the fourth exemplary embodiment, the spring disk 11 is again clamped by means of a counterpart 22 which is welded to the pin 16. In the fourth exemplary embodiment, the sealing surface of the spring disk 11 is in the form of a surface which is bent forward toward the wastegate duct 19.

FIG. 7 shows a fifth exemplary embodiment. In the fifth exemplary embodiment, the pin 16 is manufactured in one piece with the lever 12. A thread is formed on the pin 16. Correspondingly, the counterpart 22 is in the form of a nut. The spring disk 11 is clamped between the counterpart 22 and the lever 12. The sealing surface is in the form of a bead 18.

The design of the sealing surface on the spring disk 11 shown in the different exemplary embodiments is independent of the different examples of connections shown between the spring disk 11 and the lever 12. For example, in every exemplary embodiment, the sealing surface may thus be either in the form of a bead 18 or else in the form of a surface bent toward the wastegate duct 19.

In addition to the above written description of the invention, reference is hereby explicitly made to the diagrammatic illustration of the invention in FIGS. 1 to 7 for additional disclosure thereof.

LIST OF REFERENCE SIGNS

1 Exhaust-gas turbocharger
2 Turbine housing
3 Compressor housing
4 Bearing housing
5 Turbine wheel
6 Shaft
7 Compressor wheel
8 Turbine housing inlet
9 Turbine housing outlet
10 Flap arrangement
11 Spring disk (flap plate)
12 Lever
13 Flap shaft
14 Regulating rod
15 Actuator
16 Pin
17 Pin head
18 Bead
19 Wastegate duct
20 Head height
21 Diameter of the wastegate duct
22 Counterpart
23 Plain bearing

The invention claimed is:

1. An exhaust-gas turbocharger (1) comprising:
a turbine housing (2)
which has a turbine housing inlet (8) and a turbine housing outlet (9) for exhaust gas, and
which has a wastegate duct (19) between the turbine housing inlet (8) and the turbine housing outlet (9), and
a flap arrangement (10) having a pivotable flap plate for opening and closing the wastegate duct (19),
wherein
the flap plate is an elastic spring disk (11),
the flap arrangement (10) comprises a flap shaft (13) rotatably mounted in the turbine housing (2) and comprises a lever (12), wherein the lever (12) connects the spring disk (11) to the flap shaft (13) in a rotationally conjoint manner, and
the spring disk (11) comprises a recess, and the lever (12) is connected to the spring disk (11) by means of a pin (16) which projects through the recess.

2. The exhaust-gas turbocharger as claimed in claim 1, wherein the spring disk (11) is arranged so as to make direct sealing contact with the turbine housing (2) when the flap arrangement (10) is in the closed state.

3. The exhaust-gas turbocharger as claimed in claim 1, wherein the flap shaft (13) is manufactured in one piece with the lever (12), or wherein the flap shaft (13) is welded to the lever (12).

4. The exhaust-gas turbocharger as claimed in claim 1, wherein the spring disk (11) bears directly against the lever (12).

5. The exhaust-gas turbocharger as claimed in claim 1, wherein an annular, outer portion of the spring disk (11) is formed as a sealing surface.

6. The exhaust-gas turbocharger as claimed in claim 5, wherein the sealing surface is a bead (18).

7. The exhaust-gas turbocharger as claimed in claim 5, wherein the sealing surface is bent forward toward the wastegate duct (19).

8. The exhaust-gas turbocharger as claimed in claim 1, wherein the spring disk (11) is manufactured from spring steel.

* * * * *